United States Patent [19]

Tsukuma

[11] Patent Number: 4,758,541
[45] Date of Patent: Jul. 19, 1988

[54] ZIRCONIA SINTERED BODY OF IMPROVED LIGHT TRANSMITTANCE

[75] Inventor: Koji Tsukuma, Atsugi, Japan

[73] Assignee: Toyo Soda Manufacturing Co., Ltd., Shinnanyo, Japan

[21] Appl. No.: 876,410

[22] Filed: Jun. 20, 1986

[30] Foreign Application Priority Data

Jun. 20, 1985 [JP] Japan .................. 60-132971
May 16, 1986 [JP] Japan .................. 61-110864

[51] Int. Cl.$^4$ .............................. C04B 35/49
[52] U.S. Cl. .................. 501/103; 501/126; 501/152
[58] Field of Search .............. 501/103, 152, 126

[56] References Cited

U.S. PATENT DOCUMENTS

| 3,432,314 | 3/1969 | Mazdiyasni et al. | 501/103 |
| 3,640,887 | 2/1972 | Anderson | 501/103 |
| 4,645,716 | 2/1987 | Harrington et al. | 501/103 |

FOREIGN PATENT DOCUMENTS

| 0050414 | 5/1975 | Japan | 501/152 |
| 0083407 | 7/1975 | Japan | 501/152 |
| 0289070 | 11/1971 | U.S.S.R. | 501/103 |
| 0356261 | 11/1972 | U.S.S.R. | 501/103 |
| 0531795 | 10/1976 | U.S.S.R. | 501/103 |

OTHER PUBLICATIONS

Journal of Less Common Metals, 13 (1967), 530–540.
Journal of The American Ceramic Society, Mazdiyasni et al., vol. 50, No. 10, pp. 532–537.
J. of Am. Ceramic Soc., 54, [1], pp. 1–11 (Jan. 1971).
K. Tabe et al., Metal Oxides and Compound Oxides, published by Kodansha, Japan, pp. 416–417 (Apr. 20, 78), (and translations).

Primary Examiner—William R. Dixon, Jr.
Assistant Examiner—Anthony Green
Attorney, Agent, or Firm—Cushman, Darby & Cushman

[57] ABSTRACT

A zirconia sintered body comprising zirconia ($ZrO_2$), yttria ($Y_2O_3$) and titania ($TiO_2$) [$Y_2O_3/ZrO_2$=at least 2/98 by mole and $TiO_2/(ZrO_2+Y_2O_3)$=3/97 to 20/80 by mole] has a high translucence giving improved light transmittance. A zirconia sintered body comprising, in addition to $ZrO_2$, $Y_2O_3$ and $TiO_2$, 0.1 to 3 mole % of an oxide of a rare earth element of the lanthanum group has a fluorescence-radiating property as well as a high translucence.

4 Claims, 2 Drawing Sheets

ZIRCONIA SINTERED BODY OF IMPROVED LIGHT TRANSMITTANCE

BACKGROUND OF THE INVENTION

1. Field of the Invention

The present invention relates to a zirconia sintered body having an excellent translucence giving improved light transmittance.

2. Description of the Prior Art

As the translucent zirconia sintered body, a sintered body of the $ZrO_2$-$Y_2O_3$ system and a sintered body of the $ZrO_2$-CaO system are reported in Journal of the American Ceramic Society, 50, page 532 (1967) and Journal of Less-Common Metals, 13, page 530 (1967), respectively. However, the light transmittance of each of these sintered bodies is about 10% and they cannot be regarded as truly translucent materials.

SUMMARY OF THE INVENTION

It is a primary object of the invention to provide a zirconia sintered body having a high light transmittance, which can be used as an optical material.

It is considered that, for imparting a translucence to ceramics, a reduction of the scattering of light by pores by increasing the density of a sintered body, and a reduction of the scattering of light by the grain boundary by increasing the particle size of a sintered body, are effective. We carried out research into $ZrO_2$-$Y_2O_3$ sintered bodies and found that if $TiO_2$ is added to the $ZrO_2$-$Y_2O_3$ system, the growth of particles in the sintered body is remarkably promoted. However, a remarkable growth of particles generally results because the speed of growth of the particles is higher than the speed of displacement of the pores, and therefore, pores are left in the particles and it is difficult to obtain a dense sintered body. With a view to overcoming this disadvantage, we investigated the properties of the starting material powder and the sintering conditions, and as a result, found that if $TiO_2$ is added to the $ZrO_2$-$Y_2O_3$ system, a remarkable growth of particles and a complete densification can be attained without any adverse effect. Based on this finding, we succeeded in providing a zirconia sintered body having a high translucence.

The sintered body of the present invention is of the $ZrO_2$-$Y_2O_3$ system, and characterized as containing zirconia ($ZrO_2$), yttria ($Y_2O_3$) and titania ($TiO_2$), the molar ratio of $Y_2O_3/ZrO_2$ being at least 2/98 and the molar ratio of $TiO_2/(ZrO_2+Y_2O_3)$ being in the range of from 3/97 to 20/80.

DESCRIPTION OF THE PREFERRED EMBODIMENTS

Figure 1:
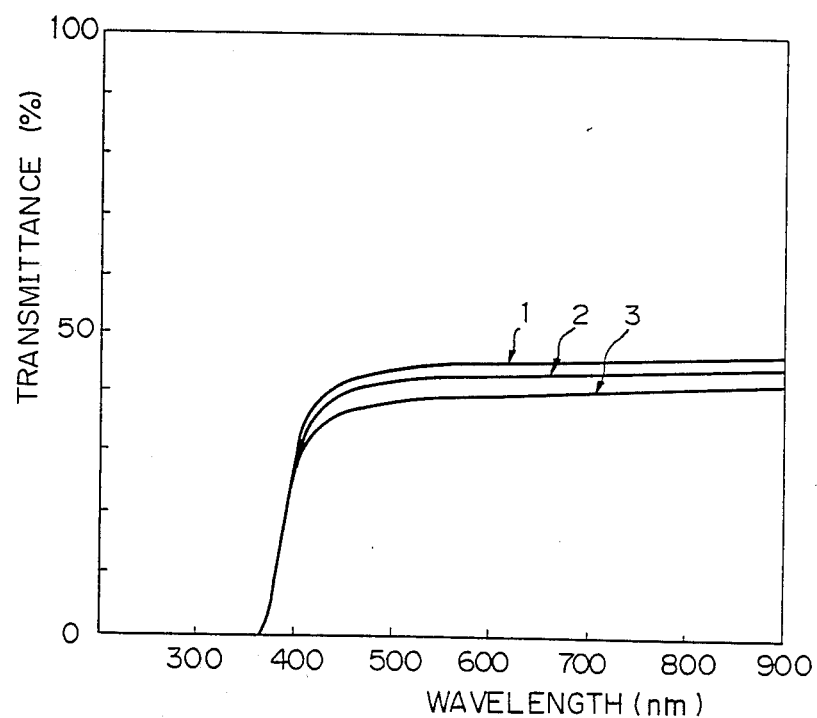
FIG. 1 is a graph showing the visible ray transmittance in Test Example A.

The zirconia sintered body of the $ZrO_2$-$Y_2O_3$-$TiO_2$ system which contains 3 to 20 mole % of $TiO_2$ is composed of a single phase of the tetragonal system at a $Y_2O_3$ content of about 2 mole % (based on the sum of $ZrO_2+Y_2O_3$) and is composed of a single phase of the cubic system at a $Y_2O_3$ content higher than 6 mole %. When the $Y_2O_3$ content is intermediate between the above-mentioned two values, the sintered body is composed of a mixed phase of the tetragonal and cubic systems. Since the sintered body composed of a single phase of the cubic system is optically isotropic, there is no scattering by the grain boundary and an optimal translucence can be obtained. It is not necessary for $Y_2O_3$ to be included in an amount exceeding 9 mole % based on the sum of $ZrO_2$ and $Y_2O_3$. The particle size of the sintered body increases with an increase of the amount of $TiO_2$ added. For example, where sintering is carried out at 1,700° C. for 2 hours, the particle size of the sintered body is 50 to 100 μm at a $TiO_2$ content of 5 mole % and 100 to 200 μm at a $TiO_2$ content of 10 mole %. The light transmittance tends to increase with an increase of the particle size. If, however, $TiO_2$ content exceeds 20 mole %, another compound $ZrTiO_4$ is formed as the second phase and the light transmittance is drastically degraded. Accordingly, in order to obtain a sufficiently high light transmittance, it is necessary that the $TiO_2$ content should be 3 to 20 mole %, preferably 5 to 20 mole %, based on the total of $ZrO_2$, $TiO_2$ and $Y_2O_3$.

The invention therefor provides in one embodiment for a translucent zirconia body wherein the molar ratio of $Y_2O_3/ZrO_2$ in the range of from 6/94 to 9/91 and the molar ratio of $TiO_2/(ZrO_2+Y_2O_3)$ is in the range of from 5/95 to 20/80.

We found that a zirconia sintered body containing a minute amount of an oxide of a rare earth element of the lanthanum group in addition to at least 6 mole % of $Y_2O_3$ (based on the sum of $ZrO_2+Y_2O_3$) and 3 to 20 mole % of $TiO_2$ (based on the sum of $ZrO_2$, $Y_2O_3+TiO_2$) has a fluorescence-radiating property in addition to translucence. The content of the oxide of the rare earth element of the lanthanum group is preferably 0.1 to 3 mole % based on the total composition, and in order to obtain an optimal fluorescence-radiating property, a content of about 1 mole % is preferred. As the oxide of the rare earth element of the lanthanum group, there can be mentioned, for example, $Nd_2O_3$, $Eu_2O_3$, and $Tb_2O_3$.

Thus, in a further embodiment, the present invention provides for a translucent, fluorescence-radiating zirconia ($ZrO_2$), yttria ($Y_2O_3$), titania ($TiO_2$) and an oxide of a rare earth element of the lanthanum group, the molar ratio of $Y_2O_3/ZrO_2$ being at least 6/94, the molar ratio of $TiO_2/(ZrO_2+Y_2O_3)$ being in the range of from 3/97 to 20/80, and the amount of the rare earth element oxide being 0.1 to 3 mole % based on the sintered body.

The process for the preparation of the sintered body of the present invention will now be described in detail.

Preferably, the starting material is a fine powder having a high purity. For example, a composition formed by sufficiently mixing a fine powder of the $ZrO_2$-$Y_2O_3$ system, having a particle size not larger than 0.1 μm and synthesized by the wet method, with a $TiO_2$ fine powder having a particle size not larger than 0.5 μm may be used. A solid solution obtained by sufficiently mixing a powder of the $ZrO_2$-$Y_2O_3$ system with a $TiO_2$ powder, calcining the mixture and pulverizing the calcined composition to an average particle sizes not larger than 0.3 μm, is especially preferred. Moreover, a fine powder of the $ZrO_2$-$Y_2O_3$-$TiO_2$ system having an average particle size not larger than 0.3 μm, which is prepared by the co-precipitation method, and a product having an average particle size not larger than 0.3 μm, which is obtained by mixing a powder of the $ZrO_2$-$Y_2O_3$ system with a solution of a titanium alkoxide, drying and calcining the mixture, and pulverizing the calcined composition, are preferably used.

Incorporation of the oxide of the rare earth element of the lanthanum group may be accomplished by adding an oxalate or the like of the rare earth element to a powdery precursor of the $ZrO_2$-$Y_2O_3$-$TiO_2$ system before calcination and then calcining the mixture.

A powder as mentioned above is molded to a predetermined shape by a rubber press molding method, a slip cast molding method or the like and the molded body is then sintered. The sintering temperature may be at least 1,400° C., and in order to attain a sufficient growth of the particles, preferably the sintering temperature is 1,600° to 1,800° C. Also, preferably the temperature-elevating rate is not higher than 100° C./hr. The sintering atmosphere may be air, but in order to obtain a higher translucence, preferably oxygen is used.

The as-sintered body has a high translucence, and in order to further improve the translucence, preferably the sintered body is treated by a hot isostatic pressing device. For the treatment conditions, preferably argon is used as the pressure medium, the pressure is at least 500 MPa, and the temperature is 1,400° to 1,700° C. Since the sintered body is reduced by this treatment, the sintered body is black. Accordingly, it is necessary that the original order should be restored by oxidizing this black sintered body in air or oxygen. The treatment temperature is at least 800° C., preferably at least 1,000° C., but the treatment temperature need not be elevated above 1,200° C.

The thus-obtained sintered body has a density higher than 99% of the theoretical value and exhibits a high transmittance to rays of the visible-to-infrared region having a wavelength of 350 to 7,000 nm. Furthermore, the sintered body comprising an oxide of a rare earth element of the lanthanum group emits a fluorescence, for example, a red fluorescence in the case of $Eu_2O_3$ or a green fluorescence in the case of $Tb_2O_3$, under irradiation with an ultraviolet ray.

The sintered body of the present invention has an excellent translucence and a high refractive index, and the sintered body of the present invention is advantageous in that a large product or a product having a complicated configuration can be easily obtained. The sintered body containing an oxide of a rare earth element of the lanthanum group can be used as a fluorescence-radiating transparent body. Accordingly, the sintered body of the present invention may be utilized as a light-transmitting material for which a heat resistance and heat insulating property are required, for example, as a material of a window of a furnace, a covering tube of a heat generating member or a protecting tube of a lamp, an infrared ray-transmitting material for an infrared ray lens or a window of an infrared fluorescent display material, a solid oscillating material or a ultraviolet ray dosemeter, and a decorative material for watches or jewelry.

The present invention will now be described with reference to the following examples.

POWDER PRODUCTION EXAMPLES 1 THROUGH 3

A mixed aqueous solution of zirconium oxychloride and yttrium chloride was boiled to effect hydrolysis. The obtained sol was dried, calcined at 900° C. and pulverized to obtain a fine powder of zirconia containing $Y_2O_3$. This powder and a solution of titanium isopropoxide were incorporated in ethanol, wet mixing was carried out, and the mixture was dried under reduced pressure, calcined at 950° C. and pulverized to obtain a fine powder of the $ZrO_2$-$Y_2O_3$-$TiO_2$ system.

POWER PRODUCTION EXAMPLE 4 THROUGH 6

A fine powder of zirconia containing $Y_2O_3$, which was obtained in the same manner as described in Powder Production Examples 1 through 3, was wet-mixed with a fine powder of titania in ethanol, and the mixture was dried, calcined at 900° C. and pulverized to obtain a fine powder of the $ZrO_2$-$Y_2O_3$-$TiO_2$ system.

POWDER PRODUCTION EXAMPLE 7

A solution of titanium isopropoxide was added to a mixed aqueous solution of zirconium oxychloride and yttrium chloride, and the mixture was heated for 3 days to effect hydrolysis. The formed sol was dried, calcined at 920° C. and pulverized to obtain a fine powder of the $ZrO_2$-$Y_2O_3$-$TiO_2$ system.

POWDER PRODUCTION EXAMPLES 8 THROUGH 13

A zirconia power was obtained in the same manner as described in Powder Production Examples 1 through 3. Separately, water was added to a solution of titanium isopropoxide to obtain a hydrolysis product of hydrous titania. The above-mentioned zirconia powder was wet-mixed with the hydrolysis product of the hydrous titania, and the mixture was dried, calcined at 1,000° C. for 2 hours and pulverized to obtain a fine powder of the $ZrO_2$-$Y_2O_3$-$TiO_2$ system.

POWDER PRODUCTION EXAMPLES 14 THROUGH 18

Neodymium oxalate was added to a mixture of a zirconia powder and a hydrolysis product of hydrous titania, which mixture was obtained in the same manner as described in Powder Production Examples 8 through 13, and the mixture was wet-pulverized, dried and calcined at 1,000° C. for 1 hour. The obtained calcined powder was pulverized to obtain a fine powder of the $ZrO_2$-$Y_2O_3$-$TiO_2$ system in which $Nd_2O_3$ was solid-dissolved.

The compositions and primary particle sizes of the thus-obtained fine powders are shown in Table 1.

SINTERING EXAMPLE A

Each of the powders obtained in Powder Production Examples 1 through 7 was molded into a disc by using a mold and a rubber press. The molded body was placed in a tubular furnace, and the temperature was elevated at a rate of 40° C./hr in an oxygen current, maintained at 1,700° C. for 2 hours and then lowered. The thus-obtained sintered body was placed in a hot isostatic press and treated under 1,000 atmospheres at 1,500° C. for 30 minutes by using argon as the pressure medium. The treated sintered body was black. Accordingly, the sintered body was placed in the tubular furnace again and was maintained at 1,200° C. for 4 hours in an oxygen current. The sintered body was recovered after cooling. Each of the obtained sintered bodies has a very high translucence. When the crystal phase was determined by X-ray diffractometry, it was found that the sintered body obtained from the powder of Powder Production Example 4 was composed of a single phase of the tetragonal system but each of the other sintered bodies was composed of a single phase of the cubic system.

TEST EXAMPLE A

The light transmittance of some of the sintered bodies obtained in sintering Example A was measured. A sample having a thickness of 0.5 to 1.5 mm and having both surfaces mirror-polished was used for the test. The obtained results are shown in FIG. 1. Reference numerals 1, 2, and 3 in FIG. 1 show the results of the sintered products obtained from the powders of Powder Production Examples 2, 5, and 3, respectively.

From FIG. 1, it is seen that in the sintered body of the present invention, the transmittance in the visible ray region was higher than 40% at a thickness of 1 mm.

TEST EXAMPLE A'

In order to examine the effect of $TiO_2$, disc-shaped sintered bodies having a thickness of 1 mm were obtained in the same manner as described in Test Example A by using a $TiO_2$-containing powder (Powder Production Example 2) and a $TiO_2$-free powder (zirconia containing 8 mole % of $Y_2O_3$).

The $TiO_2$-containing sample had a high translucence but the $TiO_2$-free sample was white. When the transmittance in the visible ray region was measured according to the method described in Test Example A, it was found that the light transmittance of the former sample was about 40% but the light transmittance of the latter sample was about 7%. The textures of the sintered bodies of these two samples were observed by a scanning type electron microscope. It was found that, by the addition of $TiO_2$, the particle size was increased to about 200 μm and an extreme growth of particles was attained, and the porosity was remarkably reduced. This proves that the addition of $TiO_2$ is very important for increasing the translucence.

SINTERING EXAMPLE B

Each of the powders obtained in Powder Production Examples 8 through 13 was molded into a plate by using a mold and a rubber press. The molded body was placed in a tubular furnace, and the temperature was elevated at a rate of 50° C./hr in an oxygen current, maintained at 1,500° to 1,750° C. for 2 hours and then lowered. Each of the obtained sintered bodies had a high translucence. Each sintered body was cut into halves and the cut pieces were treated under 1,000 atmospheres at 1,500° to 1,700° C. in a hot isostatic press (HIP) device by using argon as the pressure medium. Since all of the treated sintered bodies were black, each treated sintered body was placed in the tubular furnace again and maintained at 1,200° C. for 2 hours in an oxygen current. All of the sintered bodies recovered after cooling had a very high translucence. The crystal phase of each of the obtained sintered bodies was a cubic phase. The particle sizes and densities of these sintered bodies are shown in Table 2.

TEST EXAMPLE B

With respect to the sintered bodies obtained in Sintering Example B, the transmittances to visible and infrared rays were measured. A sample having a thickness of 0.8 mm and having both the surfaces mirror-polishing was used for the test. Each sintered body had a good transmittance to rays of the visible-to-infrared region having a wavelength of 0.35 to 7 μm. As the typical value, a linear transmittance to a ray having a wavelength of 0.6 μm is shown in Table 2.

SINTERING EXAMPLE C

Sintered bodies were prepared in the same manner as described in Sintering Example B by using the zirconia, powders obtained in Powder Production Examples 14 through 18. The crystal phase of each of the obtained sintered bodies was a cubic phase. The particle sizes and densities of the obtained sintered bodies are shown in Table 3.

TEST EXAMPLE C

Figure 2:
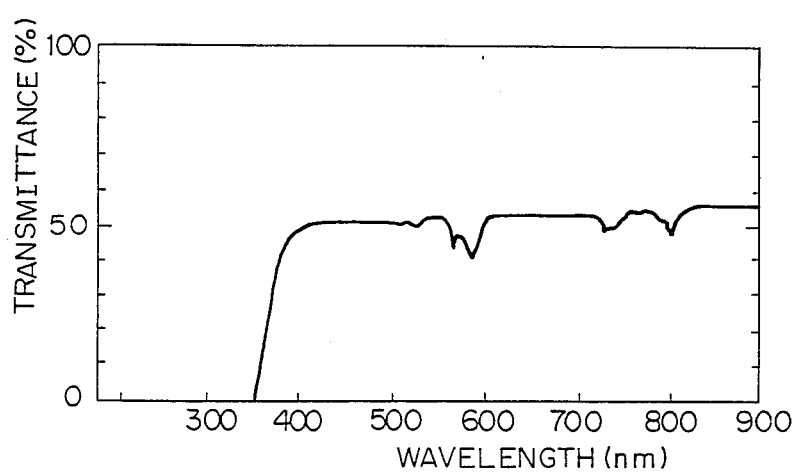
FIG. 2 is a graph showing the visible ray transmittance of sintered body sample No. 14 in Test Example C.

With respect to the sintered bodies obtained in Sintering Example C, the transmittances to visible and infrared rays were measured. A sample having a thickness of 0.8 mm and having both the surfaces mirror-polished was used for the test. Each sample had a good transmittance to rays of the visible-to-infrared region having a wavelength of 0.35 to 7 μm. The visible ray transmittance of sintered body sample No. 14 is shown in FIG. 2. Under irradiation with an ultraviolet ray having a wavelength of 0.26 μm, sintered body samples Nos. 13 and 16 emitted a red fluorescence and sintered body sample No. 15 emitted a green fluorescence.

TABLE 1

| Powder Production Example No. | $ZrO_2$ (mole %) | $Y_2O_3$ (mole %) | $TiO_2$ (mole %) | $Eu_2O_3$ (mole %) | $Nd_2O_3$ (mole %) | $Tb_2O_3$ (mole %) | Primary Particle Size (μm) |
|---|---|---|---|---|---|---|---|
| 1 | 87 | 8 | 5 | 0 | 0 | 0 | 0.05 |
| 2 | 82 | 8 | 10 | 0 | 0 | 0 | 0.08 |
| 3 | 77 | 8 | 15 | 0 | 0 | 0 | 0.10 |
| 4 | 78 | 2 | 20 | 0 | 0 | 0 | 0.04 |
| 5 | 84 | 6 | 10 | 0 | 0 | 0 | 0.05 |
| 6 | 80 | 10 | 10 | 0 | 0 | 0 | 0.10 |
| 7 | 83 | 7 | 10 | 0 | 0 | 0 | 0.05 |
| 8 | 88 | 7 | 5 | 0 | 0 | 0 | 0.03 |
| 9 | 83 | 7 | 10 | 0 | 0 | 0 | 0.04 |
| 10 | 78 | 7 | 15 | 0 | 0 | 0 | 0.03 |
| 11 | 73 | 7 | 20 | 0 | 0 | 0 | 0.02 |
| 12 | 84 | 6 | 10 | 0 | 0 | 0 | 0.05 |
| 13 | 81 | 9 | 10 | 0 | 0 | 0 | 0.03 |
| 14 | 82 | 7 | 10 | 1 | 0 | 0 | 0.03 |
| 15 | 82 | 7 | 10 | 0 | 1 | 0 | 0.03 |
| 16 | 82 | 7 | 10 | 0 | 0 | 1 | 0.03 |
| 17 | 82.7 | 7 | 10 | 0.3 | 0 | 0 | 0.03 |
| 18 | 81 | 6 | 10 | 0 | 3 | 0 | 0.05 |

TABLE 2

| Powder Production Example No. | Sintered body sample No. | Sintering temperature (°C.) | HIP treatment temperature (°C.) | Density of sintered body (g/cm$^2$) | Particle size (μm) | Linear transmittance to ray having wavelength of 0.6 μm (%) |
|---|---|---|---|---|---|---|
| 8 | 1 | 1700 | — | 5.93 | 50~70 | 42 |
|   | 2 | 1700 | 1500 | 5.93 | 50~70 | 55 |
| 9 | 3 | 1700 | — | 5.87 | 100~200 | 50 |
|   | 4 | 1700 | 1500 | 5.87 | 100~200 | 66 |
| 10 | 5 | 1700 | — | 5.77 | 150~200 | 52 |
|    | 6 | 1700 | 1500 | 5.77 | 150~200 | 65 |
| 11 | 7 | 1700 | — | 5.70 | 150~200 | 53 |
|    | 8 | 1700 | 1500 | 5.70 | 150~200 | 65 |
| 12 | 9 | 1600 | 1500 | 5.89 | 80~150 | 60 |
|    | 10 | 1500 | 1700 | 5.89 | 80~150 | 63 |
| 13 | 11 | 1600 | 1500 | 5.85 | 80~150 | 52 |
|    | 12 | 1500 | 1500 | 5.85 | 20~40 | 40 |

TABLE 3

| Powder Production Example No. | Sintered body sample No. | Sintering temperature (°C.) | HIP treatment temperature (°C.) | Density of sintered body (g/cm$^2$) | Particle size (μm) |
|---|---|---|---|---|---|
| 14 | 13 | 1650 | 1500 | 5.85 | 100~200 |
| 15 | 14 | 1650 | 1500 | 5.85 | 100~200 |
| 16 | 15 | 1650 | 1500 | 5.85 | 100~200 |
| 17 | 16 | 1650 | 1500 | 5.87 | 100~200 |
| 18 | 17 | 1650 | 1500 | 5.85 | 100~200 |

I claim:

1. A translucent zirconia sintered body consisting essentially of zirconia ($ZrO_2$), yttria ($Y_2O_3$) and titania ($TiO_2$), the molar ratio of $Y_2O_3/ZrO_2$ being at least 2/98 and the molar ratio of $TiO_2/(ZrO_2+Y_2O_3)$ being in the range of from 3/97 to 20/80.

2. A translucent zirconia sintered body as set forth in claim 1, wherein the molar ratio of $Y_2O_3/ZrO_2$ is at least 6/94.

3. A translucent zirconia sintered body as set forth in claim 1, wherein the molar ratio of $Y_2O_3/ZrO_2$ is in the range of from 6/94 to 9/91 and the molar ratio of $TiO_2/(ZrO_2+Y_2O_3)$ is in the range of from 5/95 to 20/80.

4. A translucent, fluorescence-radiating zirconia sintered body consisting essntially of zirconia ($ZrO_2$), yttria ($Y_2O_3$), titania ($TiO_2$) and an oxide of a rare earth element of the lanthanum group, the molar ratio of $Y_2O_3/ZrO_2$ being at least 6/94, the molar ratio of $TiO_2/(ZrO_2+Y_2O_3)$ being in the range of from 3/97 to 20/80, and the amount of the rare earth element oxide being 0.1 to 3 mole % based on the sintered body.

* * * * *